United States Patent
She et al.

(10) Patent No.: US 9,009,488 B2
(45) Date of Patent: Apr. 14, 2015

(54) KEY BASED SECURE OPERATING SYSTEM WITH SECURE DONGLE AND METHOD, AND CRYPTOGRAPHIC METHOD

(76) Inventors: Dong Liang She, Ottawa (CA); Daniel Charles Shapiro, Ottawa (CA); Jonathan Marc Parri, Russell (CA)

(*) Notice: Subject to any disclaimer, the term of this patent is extended or adjusted under 35 U.S.C. 154(b) by 195 days.

(21) Appl. No.: 13/529,336

(22) Filed: Jun. 21, 2012

(65) Prior Publication Data

US 2012/0331304 A1    Dec. 27, 2012

Related U.S. Application Data

(60) Provisional application No. 61/499,267, filed on Jun. 21, 2011.

(51) Int. Cl.
G06F 11/30    (2006.01)
G06F 21/85    (2013.01)
G06F 21/60    (2013.01)

(52) U.S. Cl.
CPC .............. *G06F 21/85* (2013.01); *G06F 21/602* (2013.01)

(58) Field of Classification Search
USPC ........................................................ 713/189
See application file for complete search history.

(56) References Cited

U.S. PATENT DOCUMENTS

| | | | |
|---|---|---|---|
| 6,823,068 B1 | 11/2004 | Samid | |
| 7,095,852 B2 * | 8/2006 | Wack et al. | 380/44 |
| 2003/0046568 A1 * | 3/2003 | Riddick et al. | 713/193 |
| 2005/0031120 A1 | 2/2005 | Samid | |
| 2008/0031459 A1 | 2/2008 | Voltz et al. | |

OTHER PUBLICATIONS

Ghaleh et al., A new approach for secure and portable OS, 2008, Retrieved from the Internet <URL: ieeexplore.ieee.org/xpls/abs_all.jsp?arnumber=4622557>, pp. 1-6 as printed.*
TrueCrypt, Retrieved from the Internet <URL: truecrypt.org/>, pp. 1-11 as printed.*

* cited by examiner

*Primary Examiner* — Michael Chao (57) ABSTRACT

A security interface system creates plausible deniability, and consists of a security interface device having a port for a releasable connection to a PC and to a memory key containing an encrypted operating system, the interface device containing logic to decrypt the memory key and a plaintext bootloader, and a further port for a memory card containing a key. The key is entirely encrypted and appears as random data when inspected. The interface device may have a port(s) for a keyboard and mouse. An encryption and decryption method is described, for decrypting a ciphertext into one of two plaintexts by choice of a key, the choice of which plaintext depending on whether the secret is to be revealed or remain confidential.

8 Claims, 13 Drawing Sheets

1: ALICE: $X, Y \in_R \mathbb{Z}_q$
2: ALICE: $I_1 = X^{-1} mod(q)$
3: ALICE: $I_2 = Y^{-1} mod(q)$
4: ALICE: $C_1 = -XI_2 mod(q)$
5: ALICE: $C_2 = -YI_1 mod(q)$
6: ALICE: $K_1 = (C_1 + 1)^{-1} mod(q)$
7: ALICE: $K_2 = (C_2 + 1)^{-1} mod(q)$
8: ALICE: $KEYSET = \{(C_1+1), (C_2+1), X, Y, K_1, K_2, I_1, I_2\}$
Require: ALICE: $(C_1+1) \perp (C_2+1), (C_2+1) \perp C_1, X \perp Y, K_1 \perp K_2, I_1 \perp I_2, C_1 \perp C_2$
Require: ALICE: $|KEYSET| = 8$
Require: ALICE: $KEYSET \cap \{0, 1, -1\} = \emptyset$
9: for $i = 0; i < B.length; i++$ do
10: ALICE: $D_1[i] = A[i]^{C_1} B[i]^{C_2} mod(p)$
11: ALICE: $D_2[i] = A[i]^X B[i]^Y mod(p)$
12: end for
13: if EVE then
14: ALICE $\xrightarrow{D_1[0..B.length], D_2[0..B.length], I_2, K_2}$ EVE
15: File $F[0..B.length] = 0$
16: for $i = 0; i < B.length; i++$ do
17: $B[i] = (D_1[i] D_2[i]^{I_2})^{K_2} mod(p)$
18: $F[i] = B[i]$
19: end for
20: else
21: ALICE $\xrightarrow{D_1[0..B.length], D_2[0..B.length], I_1, K_1}$ BOB
22: for $i = 0; i < B.length; i++$ do
23: $A[i] = (D_1[i] D_2[i]^{I_1})^{K_1} mod(p)$
24: $F[i] = A[i]$
25: end for
26: end if

KEY BASED SECURE OPERATING SYSTEM WITH SECURE DONGLE AND METHOD, AND CRYPTOGRAPHIC METHOD

This application claims priority to U.S. Ser. No. 61/499,267, entitled USB KEY BASED SECURE OPERATING SYSTEM WITH SECURE DONGLE AND METHOD, AND SHAPIRO-ADAMS CRYPTOGRAPHIC METHOD, filed Jun. 21, 2011, which is incorporated herein by reference.

BACKGROUND OF THE INVENTION

A. Field of Invention

The invention relates generally to the field of encryption and more particularly to an encryption system using hardware and algorithms for encryption.

B. Description of the Related Art

Laws currently exist which legally force users to divulge passwords for encrypted matter to authorities under a multitude of circumstances from border-crossing examinations to judicial warrants. If an authority representative cannot prove the existence of encrypted data within a person's possession then they are compelled to release the decryption key or potentially face criminal sanctions. If an authority representative cannot prove the existence of encrypted or concealed data on a user's disk then the user cannot be legally compelled to release the cryptographic key. This is a situation described by the expression "plausible deniability", a phrase used to describe the impossibility by authorities to prove the existence of encrypted data. With a lack of physical evidence, the presence of encrypted data cannot be proven and the user may plausibly deny that any such data exists, thereby avoiding the compulsion to divulge a password.

In many proposed solutions to the problem of plausible deniability regarding the presence of encrypted data on a secure volume, the bootloader with its leading bootsector contain unencrypted information that point to where encrypted data is stored and how it is encrypted, thus giving the presence of the encrypted data away. Traditionally, the bootloader is stored in the clear in an adjacent partition on the same disk as the encrypted information or volume. Note that this information alone isn't enough to decrypt the disk volume; however, it informs any investigative authority of the existence of concealed information on the same disk and plausible deniability is thereby forfeited. Upon request, the user can now be legally obliged to decrypt the data.

Ideally, an encrypted volume is portable and easily movable, in a portable form such as a USB key. Furthermore, an element of physical hardware security in addition to logical security of encrypted hard drives, for example, adds security because the location of a physical component can be controlled by the user. Psychological security measures, although difficult to define, can also add further security.

One proposed solution is disclosed in US Publ. No. 2005/0031120 (Samid) describing the DNL cryptographic paradigm with ease of matching many plaintexts to a given cipher. Consequently, the cipher itself cannot betray the specific plaintext, which is lost in the large list of candidate plaintexts, all of which are decryption-generated from the ciphertext in order to maintain deniability. The related U.S. Pat. No. 6,823,068 (Samid) also describes an encryption method based on charting a path on a graph, where the graph is the encryption key, and wherein numerous plaintexts can be retrieved from a single ciphertext.

Another example is US Publ. No. 2008/0031459 (Voltz), which discloses a system for securing communications between networks with a trusted third party for managing keys and identities, and uses a unique key identifier and an associated key. This is a system having multiple computers and software keys which are subject to exploitation. A hardware solution, where the hardware can be physically removed and secured, in addition to software encryption offers a more secure system than software alone.

In light of the shortcomings of the prior art in this area, there is a need for a secure encrypted USB key operating system with a secure physical hardware component such as a dongle, as well as a need for a software encryption system which may be decrypted into one of two or more plaintexts, based on the key used.

SUMMARY OF THE INVENTION

Disclosed is a security interface system for plausible deniability of encrypted data, comprising a USB key containing data, the key removably and operatively connected to the first port, a security interface device having a first port for connection to the USB key, and a second port connection to a PC, and having circuitry comprising a USB hub controller for controlling data flows to and from the ports, a USB mass storage controller containing a boot record for the contents of the USB key and logic to decrypt the USB key, and a flash memory unit, wherein the USB key is entirely encrypted so as to appear as random data, and the data on the security device is unencrypted.

Further described is the system above wherein the USB key contains an encrypted operating system.

Further described is the system above further comprising a micro SD card containing a decryption key, and the security interface further comprising a third port for receiving the micro SD card.

Further described is the system above wherein the interface device, USB key and micro SD card are all keyed to one another so as to only operate with each other.

Further described is the system above wherein the decryption key is further secure y hashed.

Further described is the system above wherein the PC is able to operate entirely on the encrypted operating system of the USB key, without resort to its own hard disk.

Further described is the system above the security interface device further comprising one or more ports for the operation of a keyboard and mouse.

Further described is the system above, the security device further comprising one or more ports for the attachment of peripherals.

Also described is a method of using a security interface system, the method comprising the steps of connecting the USB key to the interface device to form a USB chain, inserting the USB chain into the PC, starting the computer, and providing a password.

Further described is the above method further comprising the step of inserting the removable micro SD key containing the hashed decryption key.

Also described is a method of decryption of an encrypted text, the method comprising the steps of D1, $D_2$, I, K are revealed to the verifier, where D1 and D2 are the plaintexts to be revealed, and I and K form the key pair, I is initialized to a value of 0, and decryption is iteratively performed according to the equation:

$$F[i]=(D_1[i](D_2[i])^I)^K \bmod p$$

while i is an array position and is incremented by one in each iteration, until i points beyond the end of the array.

Also described is a method of encrypting a plaintext, the method comprising the steps p=2q−1 is calculated, where both p and q are prime, X and Y are selected uniformly at random from the set of real numbers Zq, $I_1=X^{-1}$ mod q and $I_2=Y^{-1}$ mod q are calculated, $C_1=-XI_2$ mod q and $C_2=-YI_1$ mod q are calculated, $K_1=(C_1+1)^{-1}$ mod q and $K_2=(C_2+1)^{-1}$ mod q are calculated, X, Y, $K_1$, $K_2$, $I_1$, $I_2$, $(C_1+1)$, $(C_2+1)$ are determined to be unique, and not to contain any members of the set $\{0, 1, -1\}$, the shorter of the plaintext input files A, B is padded so that the plaintexts A, B are identical in length, files A and B are indexed as arrays in computer memory using the index I, with each array element being a fixed size close to but smaller than p in length, and $D_1$ and $D_2$ are iteratively calculated by reference to the formulas $D_1[i]=A[i]^{C_1}B[i]^{C_2}$ mod p and $D_2[i]=A[i]^X B[i]^Y$ mod p, wherein i is an array position and is incremented each iteration and the last iteration has finished when i points beyond the array.

Still other benefits and advantages of the invention will become apparent to those skilled in the art to which it pertains upon a reading and understanding of the following detailed specification.

BRIEF DESCRIPTION OF THE DRAWINGS

The invention both as to its organization and method of operation, together with further aspects and advantages thereof, may be best understood by reference to the accompanying drawings and text thereof in light of the brief description therefore.

DETAILED DESCRIPTION OF THE INVENTION

The present invention will now be described more fully hereinafter with reference to the accompanying drawings, in which preferred embodiments of the present invention are shown. This invention may however, be embodied in many different forms and should not be construed as limited to the embodiments set forth herein. Rather, these embodiments are provided so that this application will be thorough in illustrations and brief explanation therefore to convey the true scope of the invention to those skilled in the art. Some illustrations provided herein include detailed explanations of dimension and operation and as such should be not be limited thereto.

In order to plausibly deny the existence of encrypted data, the encrypted data can have no indicators that it is actually meaningful data. Therefore, there cannot be pointers from the visible memory to the encrypted memory, in particular from a "clear" (non-encrypted) boot sector to an encrypted partition on the disk, which without being given away by the pointer would appear as meaningless data. Traditionally, the bootloader is stored in the clear in an adjacent partition on the same disk as the encrypted information or volume. Note that the bootloader information alone isn't enough to decrypt the disk volume; however, it informs any authority of the existence of concealed information on the same disk and plausible deniability is forfeited. Upon request, the user is now legally obliged to decrypt the data where laws so dictate.

The USB security interface device and system described herein is an embedded platform situated between a user's personal computer and an external USB key containing an encrypted operating system. The USB Security Interface Device offers cryptographic support with a focus on plausible deniability of the encrypted operating system. The USB security interface device facilitates plausible deniability by physically and dynamically separating information and data that can easily prove the existence of encrypted data. The solution involves moving the bootloader and bootsector information physically away from the encrypted volume severing the static connection between the un-encrypted data pointing to the encrypted volume. This physical and dynamic separation eliminates any static connections between data in the clear (unencrypted) and the encrypted volume. In the present invention, the USB security interface device physically sits between a wholly-encrypted USB key containing the data that is the subject of plausible deniability, and the computer that is reading the data. The interface device holds the bootloader information as well as part of the key required to decrypt the USB key, all in the clear. As the interface device holds the data in the clear, and the USB key data is entirely encrypted, there is no issue with static pointer traces that might alert authorities to the presence of meaningful data on the USB key. Because the USB key is entirely encrypted, should the USB key alone be investigated it will appear to be random data or a formatted partition, lending credence to plausible deniability. On travel through risky areas such as borders, for example, the interface device may be separated from the USB key. The USB security interface device when paired with a separate whole-disk encrypted operating system cannot be used to prove the existence and whereabouts of encrypted data when used individually or when paired. A micro SD card containing a hash key may reside within the interface device, another component that is further separable from the interface device and USB key. As the micro SD is tied to a particular interface device, the key residing thereon cannot be decrypted by means of another interface device due to the secure hash. While the hash can be copied, the key may not be. The assembly of the USB key, the interface device and the micro SD card is referred to as the USB chain.

Figure 1:
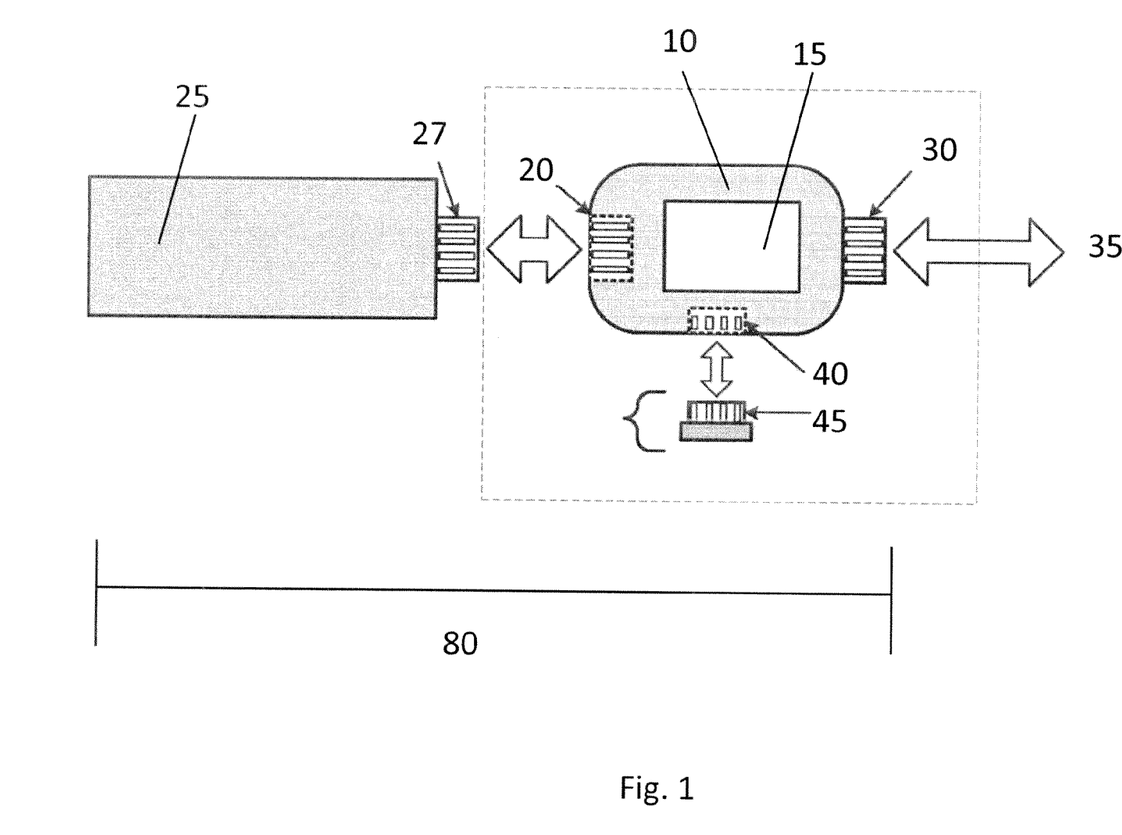
FIG. 1 is a functional diagram of the USB security interface device.
Figure 2A:
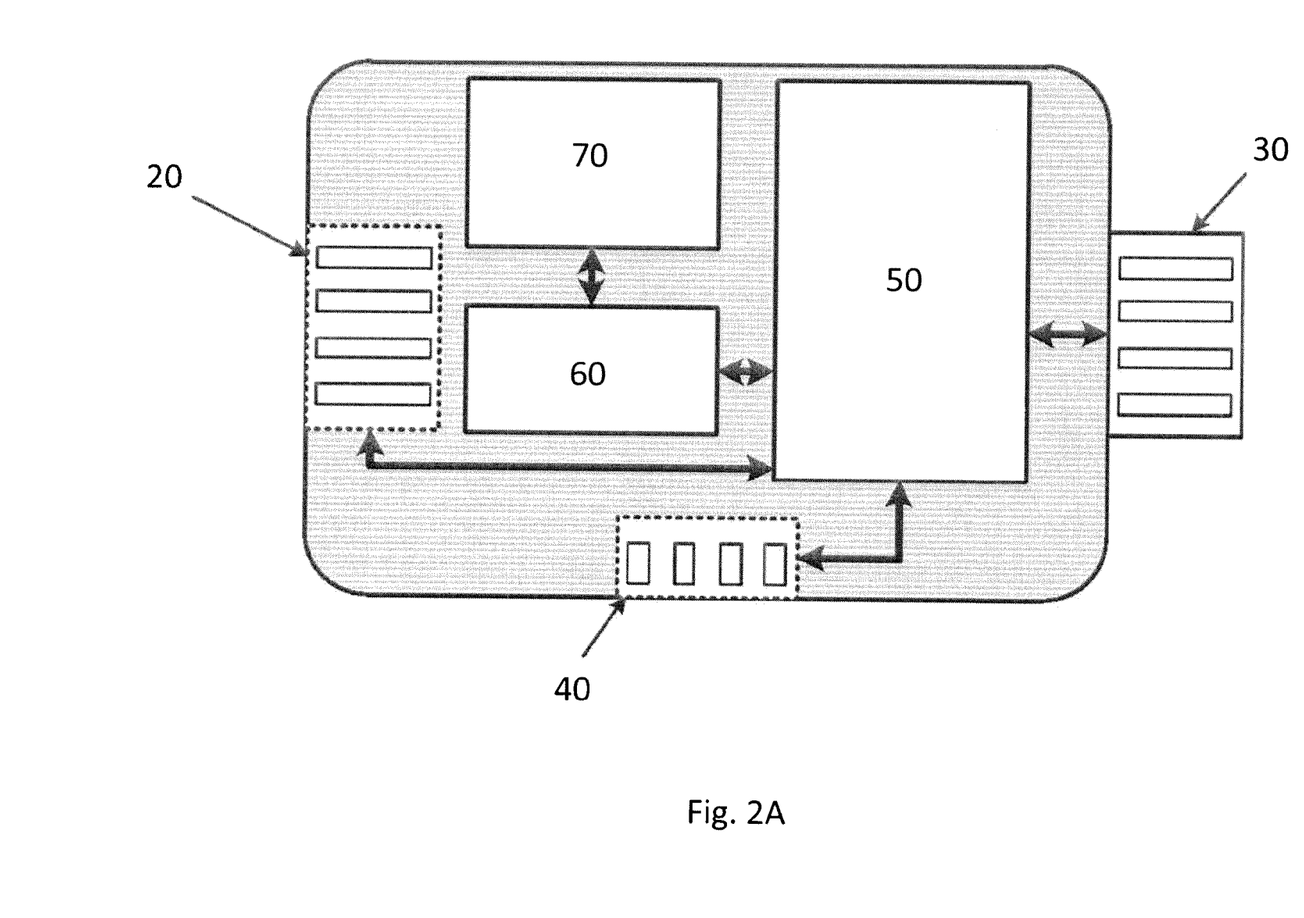
FIG. 2A is an internal component schematic of the USB security interface device.

With reference to FIG. 1, the USB security interface device 10, also known as a dongle, is shown from an external functional point of view. The USB security interface device 10 has internal circuitry 15 which is described in detail in FIG. 2. The interface device 10 has a first female USB port 20 at one side for connection to a memory key 25, in one embodiment a USB key, containing an encrypted operating system; and at an opposite side having a male USB port 30 for connection to a personal computer (PC) 35 USB port (not shown) at an opposite side, for connection to a PC 35. In one embodiment, the interface device 10 also has a second female USB memory port 40 positioned at a midpoint of the interface device 10, which is adapted to receive a removable secured memory card 45, in one embodiment a micro secure digital (SD) card, containing the decryption key. One skilled in the art would appreciate that any or all of the USB connections represent serial connections and could be replaced with another connection standard while still remaining within the scope of the application.

The USB key 25 has a male USB port 27 for interconnection with the interface device 10. The USB key 25 contents are entirely encrypted and in this example contain an encrypted operating system which is adapted for operating a PC 35, and contains all the necessary software and logic so that the PC 35 may operate without using its hard disk at all and may save and modify files that are stored on the USB key 25. However, the USB key 25 contains no boot information, all of which is stored in an unencrypted form on the interface device 10. The entire volume of the USB key 25 is encrypted with software or hardware encryption, an example of software encryption being TrueCrypt™, contained within the interface device 10. There is no identifying information remaining on the USB key 25 with the encrypted operating system. A raw dump of the memory of the encrypted USB key 25 will reveal what appears to be random data, thereby enabling plausible deniability.

With reference to FIG. 2A, the internal circuitry 15 of the interface device 10 is shown logically. Each of the three USB ports, the first female USB port 20, the male USB port 30 and the second female USB memory port 40 are all connected to the USB hub controller 50. The hub controller 50 controls the data flows to and from the USB ports 20, 30, 40. The hub controller 50 has a connection to a USB mass storage controller 60, which is in turn connected to a flash memory unit 70. The mass storage controller contains the boot record for the USB key 25 operating system, as well as logic which is able to decrypt the USB key 25 (not shown).

With reference to FIGS. 1 and 2A, the micro SD 45 contains a secure hash of the decryption key. The key is hashed to prevent decryption without the USB Security Interface Device. Furthermore, there may be encryption using an SD card token, which token is paired by a hash function to the interface device and the USB key 25, so that all must be used together, and a substitute interface device will not work to decrypt a given USB key 25 and micro SD 45 pair. The USB key 25 may only be written to through the interface device 10 with the correct micro SD 45 key. The mass storage controller 60 contains the logic to reveal the hashed decryption key contained within the micro SD 45.

The hub controller 50 also connects to a USB mass controller 60 for internal boot data and a pass through port for which the encrypted operating system USB key is to connect. A small dedicated flash memory unit 70 is connected to the USB mass controller internally. The internal memory device is configured to be bootable and contains the bootloader which mounts both the micro SD 45 containing the hashed decryption key and the USB key 25 encrypted operating system key. The bootloader will apply the decryption key and user entered password to decrypt the operating system on USB key 25.

In this embodiment, the bootloader does not specify a default memory position or address but simply uses any storage device connected to the designated port on the interface device and attempts to apply the decryption scheme. The USB key 25, taken alone, appears as being unformatted or containing random data, until it is connected with the correct interface device 10 and micro SD 45, and using the correct hash key on the micro SD 45.

In the present embodiment, decryption/encryption is performed inside the interface device 10. Besides the layer of security provided by the disk encryption software (key "A" stored in laptop memory (not shown)), the interface device 10 adds another level of encryption (key "B" stored in micro SD 45). If someone steals the computer, even while running, but without the micro SD 45, then the USB key 25 will be unreadable, appearing as random data.

Once the micro SD 45 is separated from the computer (not shown), all contents of the USB key 25 are safe from intrusion. For an additional level of security, in another embodiment, the disk (not shown) of the PC 35 is encrypted, and the disk encryption key is stored in the USB key 25.

In summary, the USB key 25 is protected by an added layer of hardware security when the interface device is added to the USB chain. To prevent a cold boot attack, the micro SD 45 is removed from the interface device. This remedy protects the data that is in the USB key 25 only; the data that is resident in the laptop memory is still susceptible to the cold boot attack. Therefore, the vKey should be used as a scratchpad for sensitive data instead of the computer's hard drive.

Figure 2B:
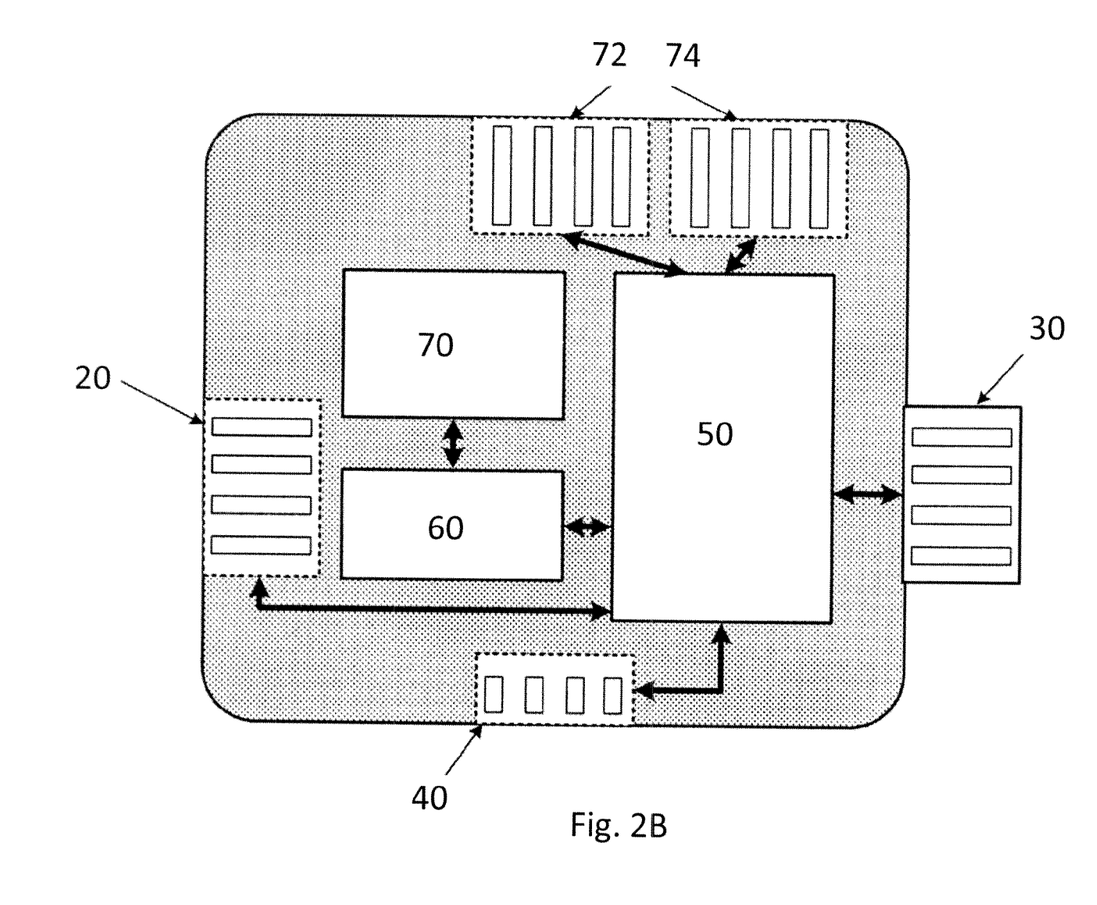
FIG. 2B is an internal component schematic of an alternative embodiment of the USB security interface device.

With reference to FIG. 2B, in an alternative embodiment, the USB interface device 10 has further USB ports for a keyboard input 72 and mouse input 74, which may foil hardware keyloggers installed between the mouse and keyboard in a compromised computer by forcing a user to physically verify their keyboard and mouse connection. A requirement that the user connect the mouse and keyboard to the interface device 10 would force the user to unplug the input devices from any keylogger devices and plug them into secure ports in the interface device. Furthermore, the interface device 10 can have further USB ports for attachment of other peripherals such as storage devices.

Figure 3:
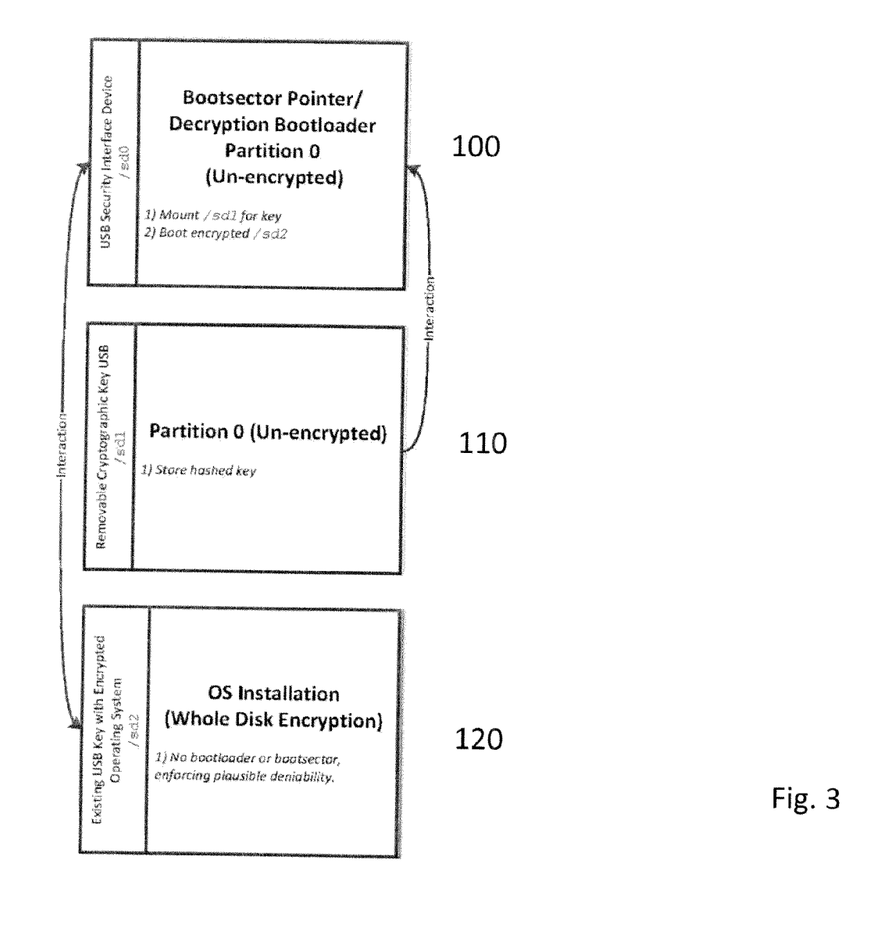
FIG. 3 is a logical diagram of partitions and volumes of the USB key.

With reference to FIG. 3, one embodiment of a possible partitioning scheme is shown. As discussed above, the boot sector pointer 100 and decryption bootloader 110 are maintained within the interface device's flash memory 70, and the PC 35 boots from the bootloader 110 on start-up. The unencrypted hashed key 120, which is stored within the micro SD 45, is retrieved by the mass storage controller 60. Upon bootup, the user is prompted for a password. The password along with a pre-hashed value on the microSD card are sent to the decryption routine. A SHA-1 pre-hash is done to ensure that there is no connection between a user-selected key and what is stored on the microSD card. The user has no way of knowing what this portion of the key will be. The hash is formed using a unique nonce found in the interface hub device. This hash is now a portion of the USB decryption key, therefore it is then signed with the public key of the interface device. The decryption key value is based on decrypting the microSD card value with a secret private key stored within the interface device and the entered password value.

The actual decryption occurs to and from the USB key. The entire volume (operating system) is not decrypted from the user perspective or the engineers perspective. However, the entire key could be decrypted into RAM and run out of there and only re-encrypted back to the key at shutdown. In any event nothing is decrypted directly to the USB key or non-volatile memory.

Figure 4A:
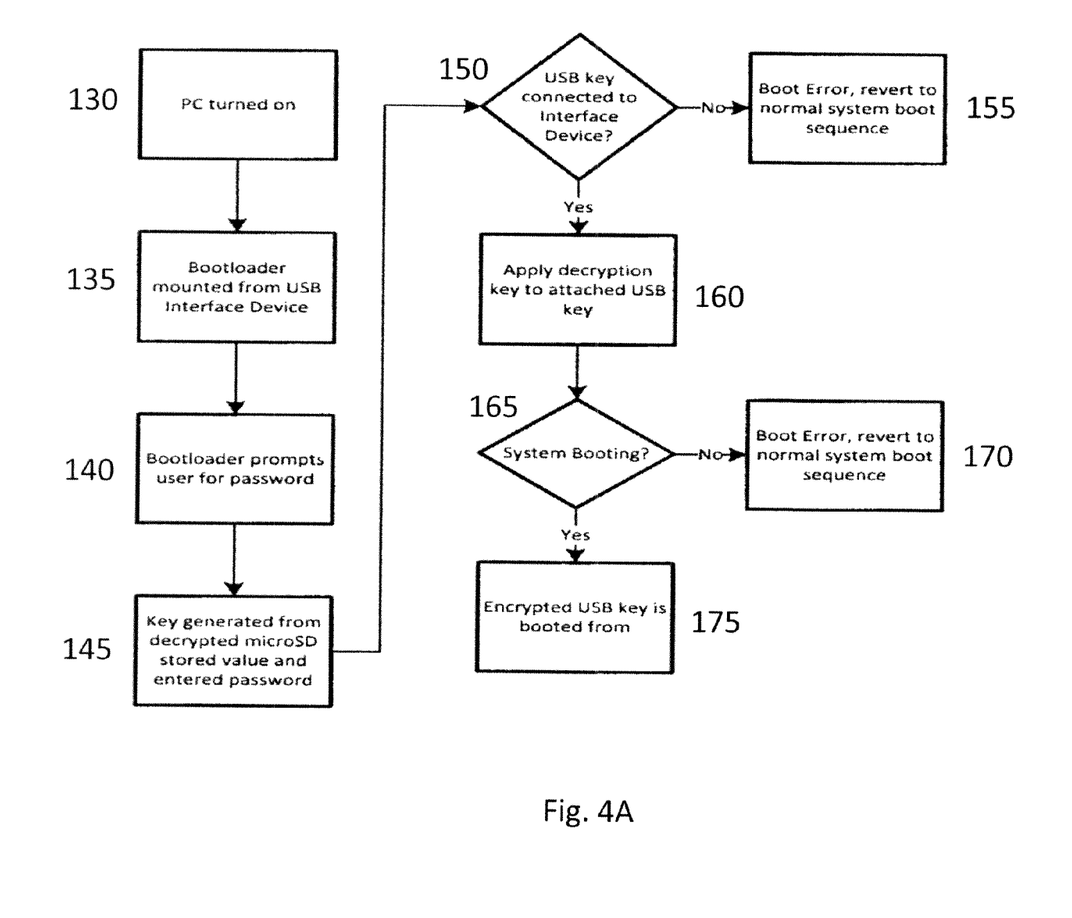
FIG. 4A is a flowchart of the startup process of the USB key-based operating system from the device perspective.

With reference to FIG. 4A, the steps for starting up the computer using the encrypted operating system contained on the USB key 25 is described. In Step 130 the PC 35 is turned on, already having the USB chain 80 attached to its serial port (not shown). In Step 135 the bootloader 100 is mounted from the USB interface device 10. In Step 140, the bootloader 100 prompts the user for a password. In Step 145 the key is generated from the decrypted micro SD 45 stored value and entered password. In Step 150, it is determined whether the USB key 25 is connected to the interface device 10. If it is not, then in Step 155 a boot error occurs, and the system reverts to the normal system boot sequence, bypassing further interaction with the interconnection device 10 altogether. If the USB key is connected to the interface device 10, then the decryption key is applied to the attached USB key 25 in Step 160. In Step 165, it is determined whether the system is booting. If it is not booting, then a boot error occurs at Step 170, and the system reverts to a normal system boot sequence. However, if the system is booting then at Step 175 the system boots from the encrypted USB key.

Therefore the particular USB key 25, interface device 10 and micro USB must be paired together in order to be able to decrypt. A substitute interface device 10 cannot be inserted, for instance, as it will not be matched to the micro SD 45 and USB key 25. The microSD 45 holds a portion of the decryption key. This key is not stored in the clear and the user has no idea what it actually is. This key is encrypted using a public key and can only be decrypted (to get the real key value) using a private key which is stored within the USB hub interface and is not exposed. Since each USB interface device 10 has a unique public/private key pair (PKI-like), each microSD 45 is tied to a USB hub interface device 10. MicroSD cards 45 can be copied but will only work with a matching hub interface device 10. Typically, a company would back up all microSD cards before giving the secure USBs and interface devices to its employees, where initial user defined passwords are set through the bootloader 100. The microSD card value is generated and encrypted during the first bootup of the interface device based off a user entered value which is hashed then encrypted as stated above. Once all three matching parts are assembled, the user must ensure the microSD card has been inserted and they are prompted to enter their password. The microSD key portion is decrypted using the unique un-known key and is concatenated with the user password allowing the interface device to decrypt the USB key 25 which holds the operating system.

Figure 4B:
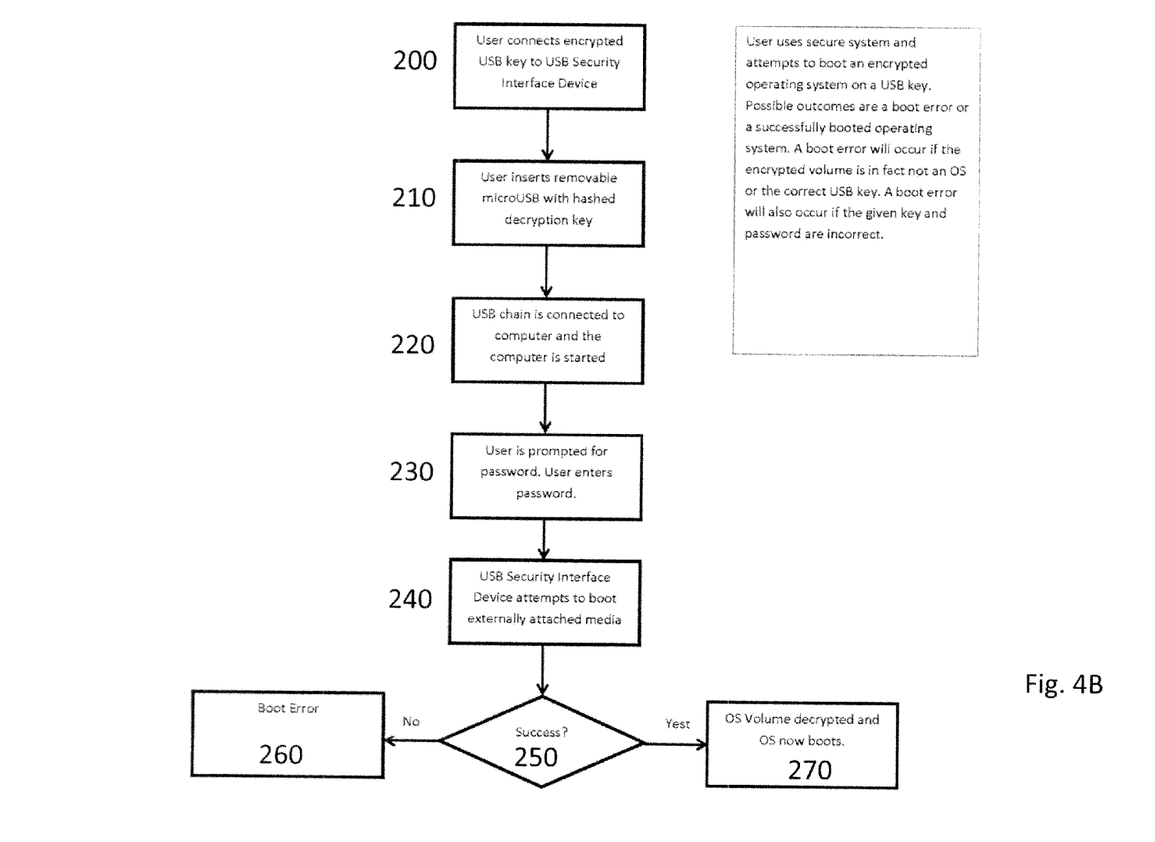
FIG. 4B is a flowchart of the startup process of the USB key based operating system from the user perspective.

With reference to FIG. 4B a situation is described wherein the user uses the above secure system and attempts to boot an encrypted operating system on the USB key 25. The possible outcomes, as shown below, are a boot error or a successfully booted operating system. A boot error will occur if the encrypted volume is not the USB key 25 associated with the interface device 10, or if the USB key 25 does not contain an operating system. A boot error will also occur if the given key and password are incorrect.

In FIG. 4B, a flowchart showing the method of boot procedure, from the user's perspective is shown. At step 200, the user connects the encrypted USB key 25 to the interface device 10. In step 210 the user inserts the removable micro SD key 40 containing the hashed decryption key. In step 220, the USB chain 80 comprising the USB key 25 attached to the interface device 10, is connected to the PC 35 USB slot and the computer is started. In step 230, the user is prompted for a password. In step 240, the interface device 10 attempts to boot the externally attached media. If the booting is not successful in step 250, the PC 35 will report a boot error. If the booting is successful in step 250, in step 270 the OS volume on the USB key 25 is decrypted and the OS boots.

Figure 5:
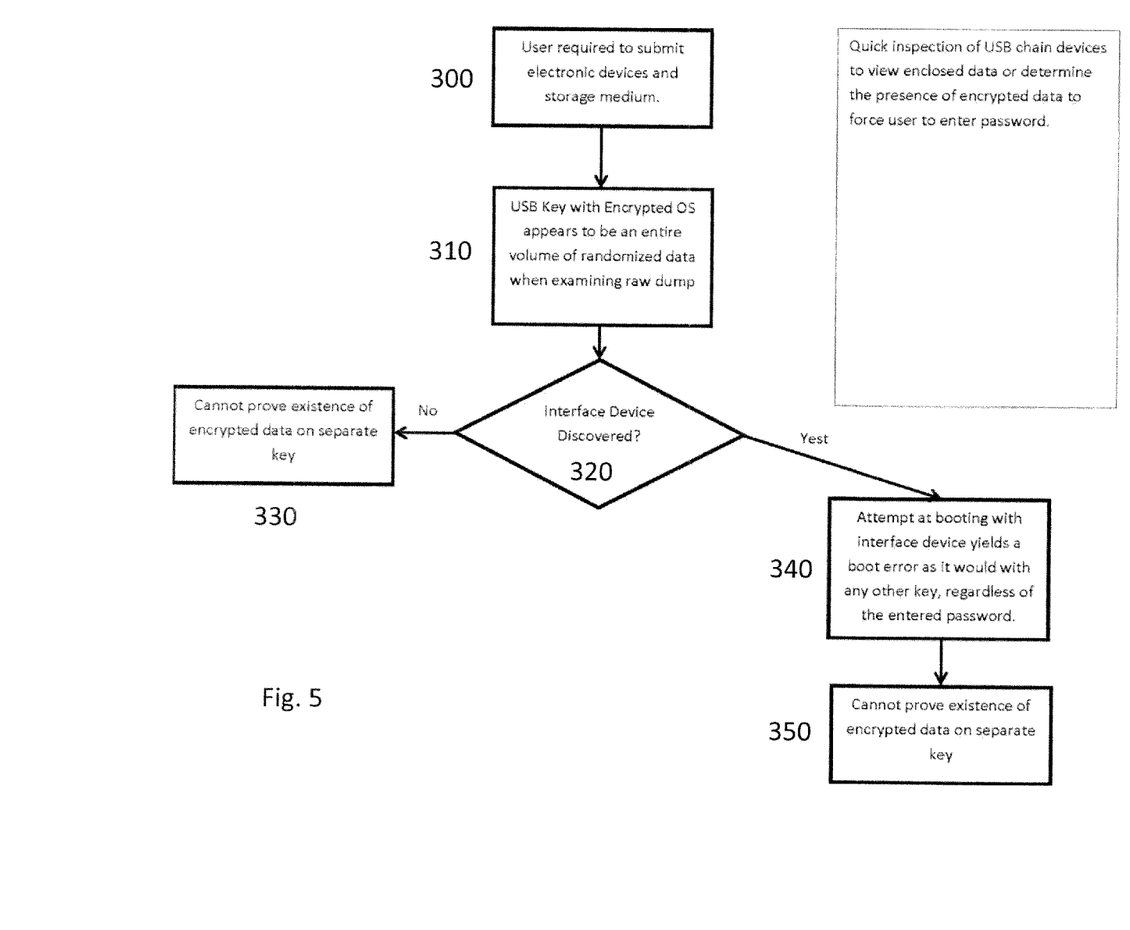
FIG. 5 is a flowchart of the plausible deniability of the USB key-based operating system in the situation of a quick inspection by an analyst.

With reference to FIG. 5, the situation of a quick inspection of USB chain devices to view enclosed data or determine the presence of encrypted data to force user to enter password is described. Plausible deniability is ensured since the interface device 10 does not expose the fact that a connected volume, in this embodiment the USB key 25, is encrypted unless a proper key and password are available. The data remains in a state of un-identifiable entropy. We are simply aware of mountable point for which any USB device can be connected to. Any USB peripheral can be connected and the operation will fail. As the key on the micro SD 45 is formed from a hash and subsequently encrypted, the decryption key cannot be extracted and used without the interface device 10.

In Step 300, the user is required to submit electronic devices and storage media to authority FIGURES for testing. In step 310, the USB key with encrypted operating is made where the interface device 10 is discovered system is reviewed by the authority by means of a raw dump, and appears to be an entire volume of randomized data. At step 320 a decision or not. If the device 10 is not discovered, step 330 results in the inability of the authority to prove existence of encrypted data on a separate key, since without the interface device 10 the USB key 25 appears as randomized data, hardly a proof of existing encrypted data. If the interface device 10 is discovered, in Step 340 the attempt at booting with the interface device 10 yields a boot error as it would with any such device, regardless of password. There is no difference in the outcome between having the micro SD 45 plugged in and entering an incorrect password, and having no micro SD 45 attached and entering either a correct or incorrect password. Since the data cannot be decrypted and appears as randomized data, at step 350 the authority cannot prove the existence of encrypted data on the USB key 25.

Figure 6:
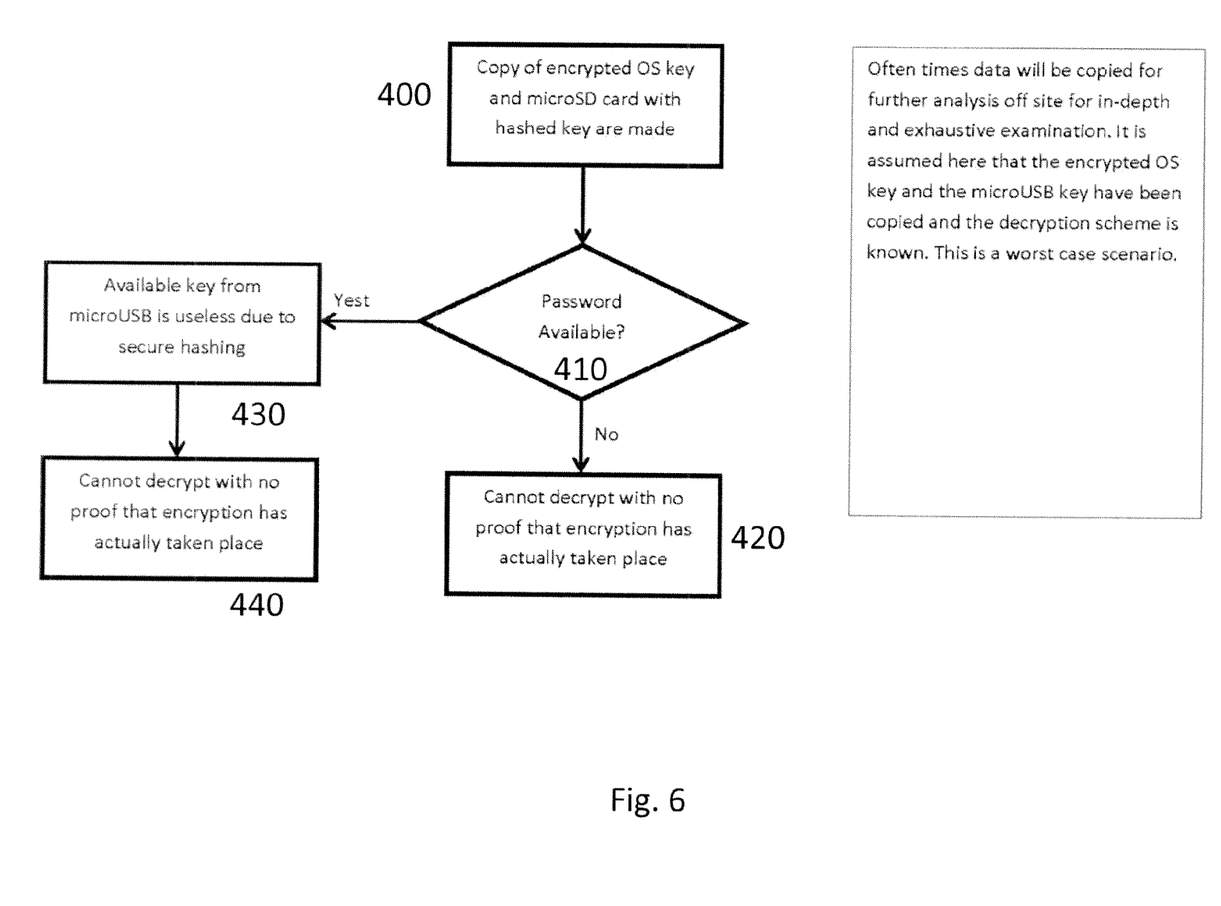
FIG. 6 is a further flowchart of the plausible deniability in the situation of an in-depth examination by an analyst.

With reference to FIG. 6, oftentimes data will be copied for further analysis off site for in-depth and exhaustive examination by analysts. It is assumed for the purposes of this FIGURE that the encrypted OS key and the micro SD 45 have been copied and the decryption scheme is known. This is a worst case scenario. In step 400, a copy of the encrypted OS key and micro SD card containing the hashed keys are made. However, the analysts are missing the nonce-value for the hash, the PKI information and the user password. Further it is assumed that the analysts did not keep the interface device 10 and only kept the data bits from the interface device 10 and micro SD 45. At step 410, whether the password is available is determined. If the password is not available, at step 420 the analysts cannot decrypt the contents of the USB key 25 without proof that encryption has actually taken place. If the password is available, the key contained in the micro SD 45 is useless due to secure hashing, represented by step 430, and the result in step 440 is that the analysts cannot decrypt the contents of the USB key with no proof that encryption has actually taken place.

Figure 7:
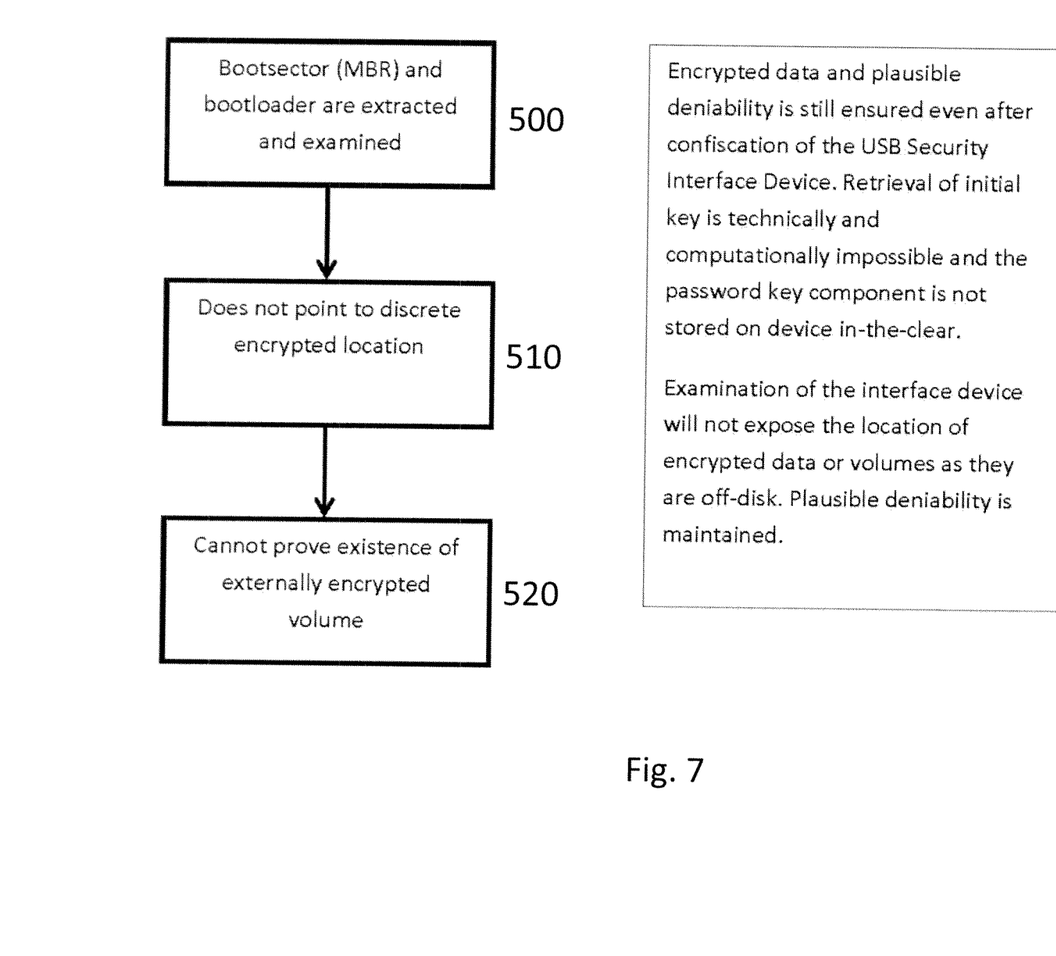
FIG. 7 is a further flowchart of the plausible deniability of the USB key-based operating system in the situation of confiscation of the interface device.

Encrypted data and plausible deniability is still ensured even after confiscation of the USB interface device 10, as shown with reference to FIG. 7. Retrieval of the initial key is technically and computationally impossible and the password key component is not stored on the device in the clear. Examination of the interface device 10 will not expose the location of encrypted data or volumes as they are off-disk. Plausible deniability is maintained.

Further, with reference to FIG. 7, in this situation the interface device has been seized by analysts, however the USB key 25 is separate and not available. At step 500 the bootsector, residing on the Master Boot Record or MBR, and bootloader are extracted and examined by the analysts. Neither bootsector nor bootloader point to a discrete encrypted location in step 510, and so in step 520 the analyst cannot prove existence of an externally encrypted volume.

Encryption Algorithm

The present encryption algorithm is provably as secure as the discrete logarithm problem and provides plausible deniability. A particular feature of the algorithm is that it can reveal either plaintext (real or decoy) from the encrypted data stored in memory using the same operation but different keys. This may be particularly useful where a password must be divulged in a compromised situation—a false password can reveal a false but sensible plaintext from the ciphertext, without revealing the true plaintext, which remains secure. Revealing one possible plaintext does not leak information about other plaintexts hidden in the ciphertext. Secret files, that is, any alternative plaintexts to the one that is decrypted, are corrupted through normal use, unless both singular secret and decoy keys are known, because each time a sector is retrieved and then stored onto the disk, the written encrypted sector loses the information on hidden plaintexts for which the secret key was not provided. The Algorithm is therefore useful for hiding signatures and files, in particular large files using small secret keys. As well, it can be used for presenting decoy messages while hiding real messages, providing multiple levels of decoys, and having extensive linked lists of decoys in the array of file data. Unlike a one-time pad, the length of the secret key is small in proportion to the size of the hidden plaintexts. The algorithm may be used with the interface device 45 described above, however it is not necessarily so, and it can be used on its own where a password may be divulged in a compromised situation, producing a decoy plaintext that does not reveal the true secret information.

Figure 8:
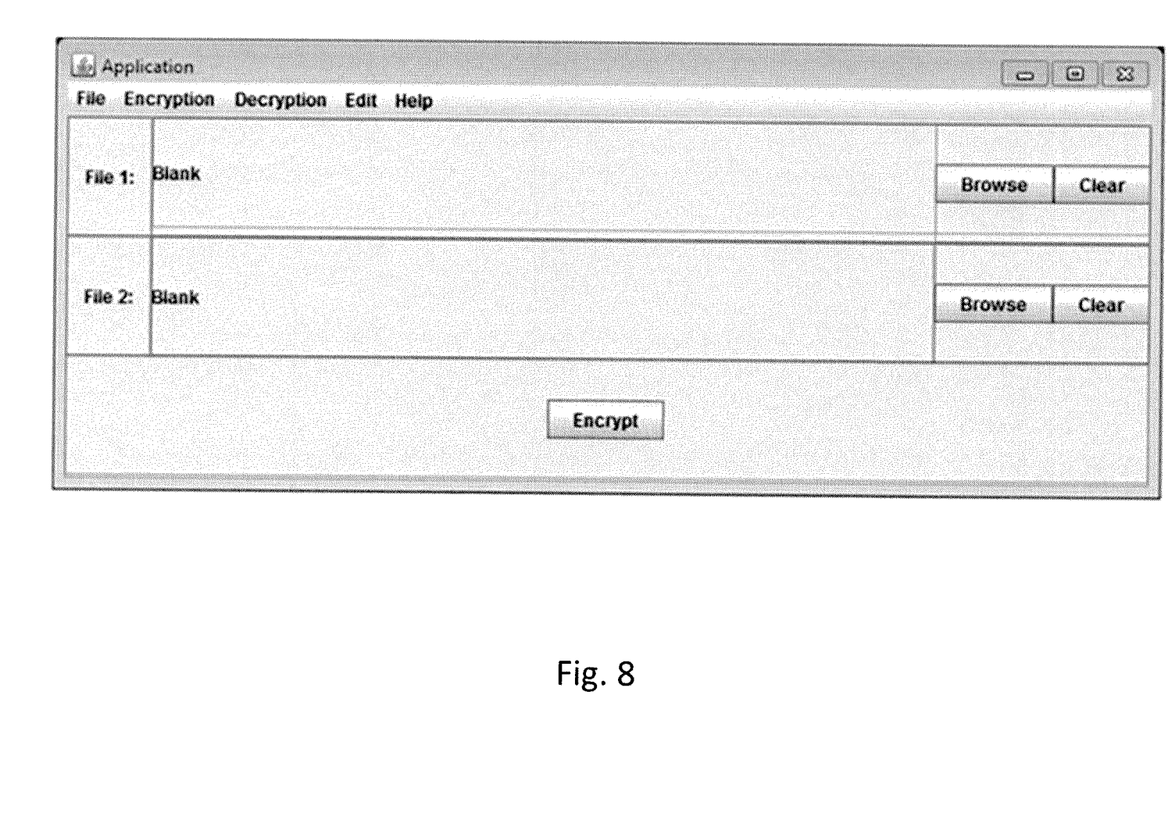
FIG. 8 is an example of an interface for using the cryptographic algorithm within the USB key.

The protocol may be used with the interface device 45, implemented by hardware or software, wherein the protocol provides the encryption of the USB key 25, and may accessed by means of a graphical user interface for encryption and decryption, for which a sample user interface is provided in FIG. 8. The use of the algorithm for the encrypted USB key 25 provides a decoy plaintext, which can be revealed in cases of compulsion to decrypt data, as described above, maintaining the secrecy of the original plaintext. Using the SD card inserted into the interface device, the real plaintext or the decoy plaintext can be decrypted according to the key, or both.

Figure 9:
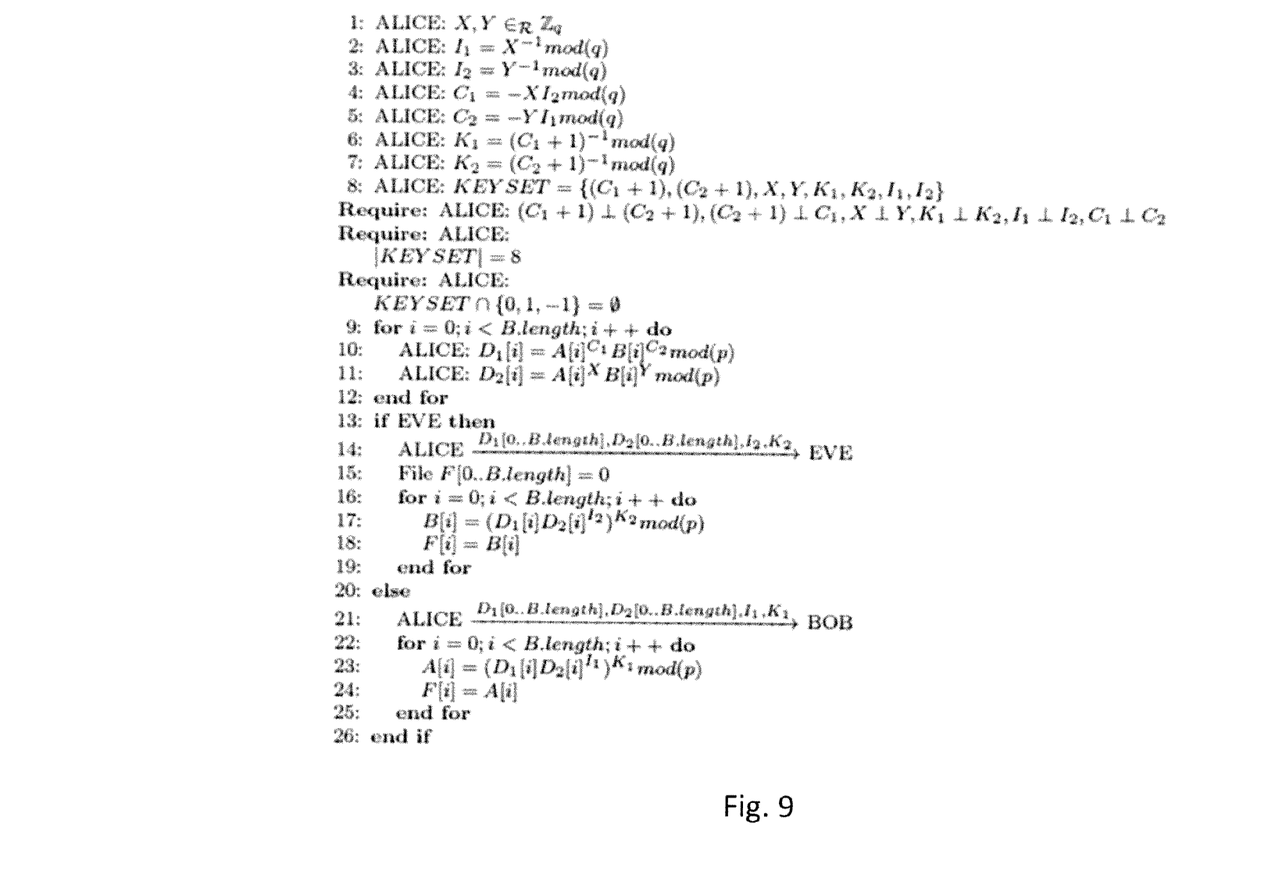
FIG. 9 is a proof of the algorithm using 2 plaintexts.

The protocol may be used for automated re-encryption service to prevent the removal of secret documents from government facilities or through firewalls. In order to prevent the protocol from being used to smuggle secrets out of secure locations, we propose a re-encryption service with reference to FIG. 9 where the following actions are taken by the checkpoint guard Eve and the smuggler Alice:

1. Alice reveals plaintext B from the ciphertext $D_1, D_2$ for the border guard Eve to read.
2. Eve deletes $D_1, D_2$ by writing over it many times with random bits.
3. Eve encrypts B into a new $D_1, D_2$ and provides Alice with the keys $K_2, I_2$ for accessing B.
4. Alice may decide to re-encrypt B under a different key after crossing the border, but at least Eve can be assured that Alice did not use the protocol to hide a second plaintext A.

The aforementioned re-encryption service can take place inside of a router or firewall as well. The transmission of data offsite will thereby be secured from smuggling with the protocol.

The algorithm follows a protocol for selecting keys, matching plaintext lengths, encrypting, and revealing plaintexts. The example in FIG. 9 shows how two large plaintexts A and B can be viewed as arrays of raw data, and using the keys X, Y, $C_1$, and $C_2$, the raw data can be encrypted into the ciphertexts $D_1$ and $D_2$ (lines 10 and 11). The key pairs $(I_1, K_1)$ and $(I_2, K_2)$ can be used to reveal A or B respectively (lines 20-26 and 13-19).

Figure 10:
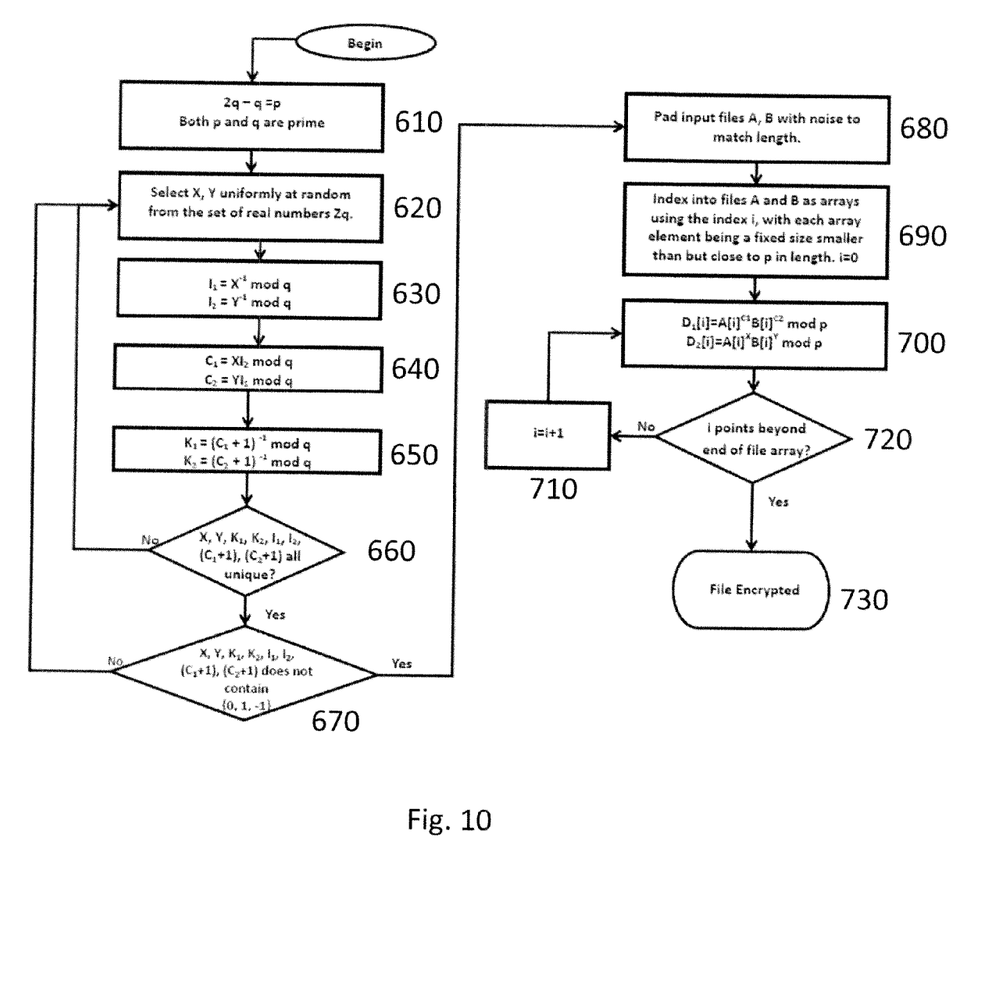
FIG. 10 is a flowchart of key generation and file encryption processes for the algorithm with two plaintexts.

With reference to FIG. 10, at Step 610, $p=2q-1$ is calculated, where both p and q are prime. In step 620, X and Y are selected uniformly at random from the set of real numbers Zq. In Step 630, $I_1 = X^{-1}$ mod q and $I_2 = Y^{-1}$ mod q are calculated. In step 640, $C_1 = -XI_2$ mod q and $C_2 = -YI_1$ mod q are calculated. In step 650, $K_1 = (C_1+1)^{-1}$ mod q and $K_2 = (C_2+1)^{-1}$ mod q are calculated. In Step 660, it is determined whether X, Y, $K_1$, $K_2$, $I_1$, $I_2$, $(C_1+1)$, $(C_2+1)$ are all unique. If not, then the series of numbers are redetermined and steps 620 through 650 are repeated. If the variables are all unique, then the method proceeds to step 670, where it is determined if X, Y, $K_1$, $K_2$, $I_1$, $I_2$, $(C_1+1)$, $(C_2+1)$ does not contain any members of the set $\{0, 1, -1\}$. If the variables do contain one or more members of the set $\{0, 1, -1\}$, then the method returns to step 620 for redetermination of the values. If the variables do not contain any members of the set $\{0, 1, -1\}$, then the method proceeds to step 680, wherein the shorter of the plaintext input files A, B is padded so that the plaintexts A, B are identical in length. In step 690 the method indexes files A and B as arrays in computer memory using the index i, with each array element being a fixed size close to but smaller than p in length. In step 700, $D_1$ and $D_2$ are calculated by reference to the formulas $D_1[i] = A[i]^{C_1} B[i]^{C_2}$ mod p and $D_2[i] = A[i]^X B[i]^Y$ mod p. In Step 710, it is determined if i points beyond the end of the file array. If not, then repeat step 700 continually all the while monitoring i in Step 710, until i points beyond the file array, which results in an encrypted file in Step 730.

Figure 11:
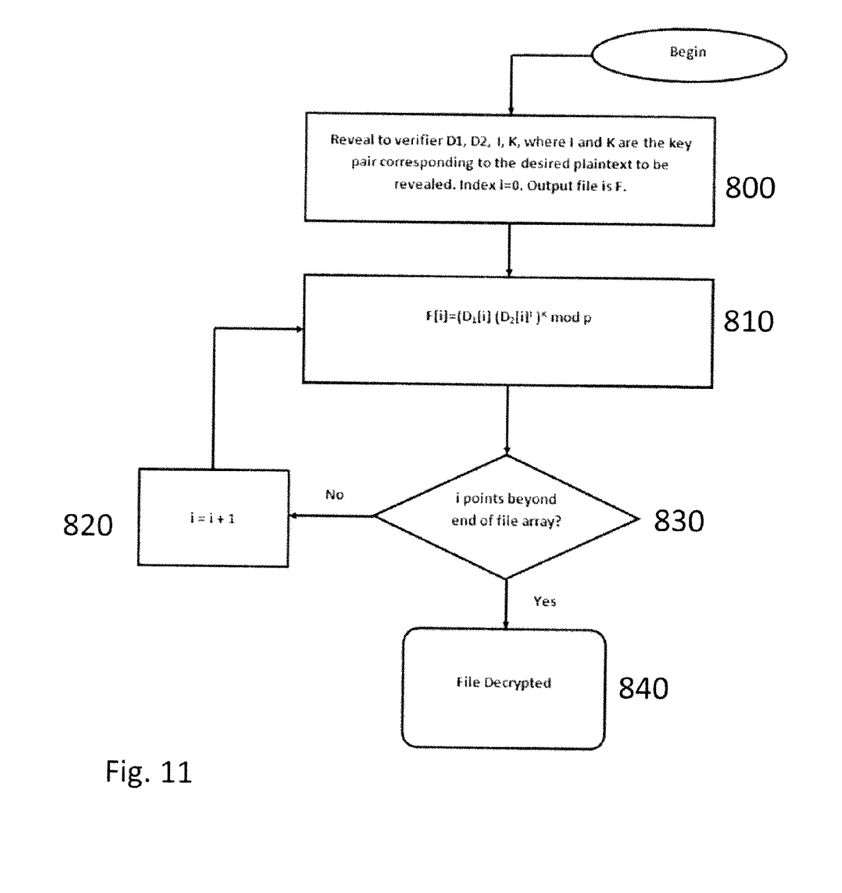
FIG. 11 is a flowchart of the decryption process for the cryptographic algorithm.

With reference to FIG. 11, the decryption procedure is shown. In Step 800, $D_1$, $D_2$, I, K are revealed to the verifier, where I and K are the key pair corresponding to the desired plaintext to be revealed. The index i is initialized to a value of 0. The output of the iteration is put in the output file F. In Step 810, the iterative process of the decryption proceeds, following the equation:

$$F[i] = (D_1[i](D_2[i])^I)^K \bmod p$$

In Step 820, if i does not point beyond the end of the array, then i is incremented and Step 830 is repeated for the next iteration in step 810, with i having been incremented by 1. If in Step 830 the end of the array has been reached, and i points beyond the end of the array, then in step 840 the decryption is completed.

Although the invention has been described above by reference to certain embodiments of the invention, the invention is not limited to the embodiments described above. Modifications and variations of the embodiments described above will occur to those skilled in the art in light of the above teachings. Moreover, with respect to the above description, it is to be repulsed that the optimum dimensional relationships for the component members of the present invention may include variations in size, material, shape, form, funding and manner of operation.

We claim:

1. A security interface system for plausible deniability of encrypted data, comprising:
   a. a first port for connection to a memory key, and a second port for connection to a PC;
   b. the memory key containing encrypted data, the key removably and operatively connected to the first port;
   c. circuitry comprising a hub controller for controlling data flows to and from the ports;
   d. a mass storage controller containing a boot record for the contents of the key and logic to decrypt the key; and e. a bootsector having static pointer traces to encrypted data on the memory key, wherein the bootsector is physically separable from the encrypted data located on the memory key, the separation resulting in removal of static pointer traces pointing to data on the memory key for maintaining plausible deniability wherein the memory key is entirely encrypted, so as to appear as random data without trace of encryption, maintaining plausible deniability when separated from the bootsector.

2. The system of claim 1, wherein the key contains an encrypted operating system.

3. The system of claim 1, the interface system further comprising a card containing a decryption key, and the security interface further comprising a third port for receiving the card.

4. The system of claim 3, wherein the interface device, key and the card are all keyed to one another so as to only operate with each other.

5. The system of claim 3 wherein the decryption key is further securely hashed.

6. The system of claim 1, wherein the PC is able to operate entirely on the encrypted operating system of the key, without resort to its own hard disk.

7. The system of claim 1, the security interface device further comprising one or more ports for the operation of a keyboard and mouse.

8. The system of claim 1 the security device further comprising one or more ports for the attachment of peripherals.

* * * * *